US008440252B2

(12) United States Patent     (10) Patent No.: US 8,440,252 B2
Ghosh et al.     (45) Date of Patent: May 14, 2013

(54) IODIZED SALT AND A PROCESS FOR ITS PREPARATION

(75) Inventors: Pushpito Kumar Ghosh, Bhavnagar (IN); Sathishbhai Hariray Mehta, Bhavnagar (IN); Jatin Rameshchandr Chunawala, Bhavnagar (IN); Mrunal Vinodray Sheth, Bhavnagar (IN); Mahesh Ramnikla Gandhi, Bhavnagar (IN)

(73) Assignee: Council of Scientific and Industrial Research, New Delhi (IN)

( * ) Notice: Subject to any disclaimer, the term of this patent is extended or adjusted under 35 U.S.C. 154(b) by 1054 days.

(21) Appl. No.: 12/086,542

(22) PCT Filed: Dec. 24, 2004

(86) PCT No.: PCT/IN2004/000405
§ 371 (c)(1),
(2), (4) Date: Jul. 1, 2010

(87) PCT Pub. No.: WO2006/067798
PCT Pub. Date: Jun. 29, 2006

(65) Prior Publication Data
US 2011/0008497 A1    Jan. 13, 2011

(51) Int. Cl.
*A23L 1/237* (2006.01)
(52) U.S. Cl.
USPC .......................................... 426/649; 426/645
(58) Field of Classification Search ................... 426/649
See application file for complete search history.

(56) References Cited

U.S. PATENT DOCUMENTS 6,740,253 B2   5/2004   Vohra et al.
2006/0003024 A1*   1/2006   Ghosh et al. .................. 424/667

FOREIGN PATENT DOCUMENTS
JP     53052665 A   *   5/1978

OTHER PUBLICATIONS

Sumar: (1997),"Iodine in food and health", Nutrition & Food Science, vol. 97 Iss: 5 pp. 175-183.*
Brunton, Sir Thomas Lauder: Lectures on the action of medicines: being the course of lectures on pharmacology and therapeutics delivered at St. Bartholomew's Hospital during the summer session of 1896; The Macmillan Company, 1903, 673 pages, p. 584-585.*
MSDS 3: http://www.chemicalland21.com/lifescience/foco/POTASSIUM%20IODATE.htm: MSDS for Potassium Iodate.*
MSDS 2: http://www.chemcas.com/msds112/cas/4449/7681-11-0_7758-05-6_144-55-8.asp: MSDS for the combination of Potassium Iodate and Iodide.*
MSDS 1: http://apps.risd.edu/envirohealth_msds/Textiles/iodizedsalt.pdf: MSDS for Iodized Table Salt.*
Kumar: Determination of iodate and sulphate in iodized common salt by ion chromatography with conductivity detection; Analytical Chemistry Di6ision, Bhabha Atomic Research Centre, Mumbai 400085, India; accepted Jul. 5, 2000.*
Diosady: Stability of iodine in iodized salt used for correction of iodine-deficiency disorders. II; Food and Nutrition Bulletin, vol. 19, No. 3; © The United Nations University, 1998; United Nations University Press; p. 240-250.*
Burgi: The Toxicology of Iodate: A Review of the Literature; Thyroid vol. 11, No. 5, 2001 Mary Ann Liebert, Inc.*
Baryshev: WO 2004083121 A1, Sep. 30, 2004, Machine Translation from Russian.*
Hetzel: The Prevention and Control of Iodine Deficiency Disorders—Nutrition Policy Discussion Paper No. 3; United Nations Administrative Committee on Coordination/Subcommittee on Nutrition; ACC/SCN State-of-the-Art Series Nutrition Policy Discussion Paper No. 3; Mar. 1988.*
Aquaron, R., "Iodine content of non iodized salts and iodized salts obtained from the retail markets worldwide", Proceedings of the $8^{th}$ World Salt Symposium, vol. 2, 2000, pp. 935-940.
Diosady, L. L., et al., "Stability of iodine in iodized salt used for correction of iodine-deficiency disorders", Food and Nutrition Bulletin, vol. 18, No. 4, Dec. 1997, pp. 388-396.
Halek, F., "Investigation on the stability of Iodide and Iodate in table salts in Iran and the determination of its impurities", Proceedings of the $8^{th}$ World Salt Symposium, vol. 2, 2000, pp. 1251-1252.
Ullmann's Encyclopedia of Industrial Chemistry, Sixth Edition, 2002 Electronic Release Iodine and Iodine Compounds—Toxicology and Occupational Health (Phyllis A. Lyday).
Laboratoire de Biochimie, Faculte de Medecine, 27 Bd Jean Moulin 13385 Marseille Cedex 05, France, Iodine Content of Non Iodized Salts and Iodized Salts Obtained From the Retail Markets Worldwide, pp. 935-940.
J.T. Dunn, The Use of Iodized Oil and Other Alternatives for the Elimination of Iodine Deficiency Disorders, pp. 109-114.
F. Halek, S. Boghozian, Investigation on the Stability of Iodide and Iodate in Table Salts in Iran and the Determination of Its Impurities, pp. 1251-1252.
Guillermo Arroyave, Ph.D. Bull. Org. Mond. Sante. Bull. Wld. Hlth Org. 1956, 14, 183-185 The Stability of Potassium Iodate in Crude Table Salt.
Pharmacology and Pharmaco-Therapeutics p. 548.
L.L. Diosady, et al. Food Research International 35 (2002) 635-642 Microencapsulation for Iodine Stability in Salt Fortified With Ferrous Fumarate and Potassium Iodie.
http://164.100.176.38/patent search/publishedsearch/publish application number.aspx?applicaton_num . . . Complete Specification.

* cited by examiner

*Primary Examiner* — Patricia George
(74) *Attorney, Agent, or Firm* — Ladas & Parry LLP

(57) ABSTRACT

The invention discloses a novel iodizing agent containing latent elemental iodine and preparation of iodized salt therefrom. The iodizing agent comprises a mixture of iodide and iodate in solution form in 5:1 molar ratio. The said iodizing agent may be prepared cost-effectively through the reaction of pure iodine crystals with a suitable alkali. Iodized salt prepared therefrom is stable in the pH range of 7.0-8.0 whereas it releases the latent elemental iodine under acidic conditions such as that which prevails in the stomach.

14 Claims, No Drawings

IODIZED SALT AND A PROCESS FOR ITS PREPARATION

FIELD OF THE INVENTION

The present invention relates to an improved iodized salt and a process for the preparation of sad improved salt. More particularly, the invention relates to iodization of edible salt with a novel iodizing agent that can be prepared cost effectively, is stable at neutral pH, and releases elemental iodine—believed to be the most bioavailable form of inorganic iodine—in the acidic environment of the stomach.

BACKGROUND OF THE INVENTION

Iodine is a very important trace element necessary in the biosynthesis of thyroid hormones. Iodine is required for developing and maintaining a healthy body. There are well known Iodine Deficiency Disorders like Goiter and Cretinism.

Reference may be made to Ullmann's Encyclopedia of Industrial Chemistry, Sixth Edition (electronic version), 2002, wherein it is stated under *Toxicology and Occupational Health of Iodine* and its compounds that: "Iodine is absorbed by the body and concentrated in the form of diiodotyrosine and triiodothyronine, which form thyroxine that is stored as thyroglobulin. Thyroxine is secreted by the thyroid, enters the circulation, and is carried to the peripheral tissues where it controls tissue metabolism primarily through regulation of enzyme activities. Iodine is essential to higher animals and humans. A normal person requires about 75 mg of iodine per year.

Reference may be made to the same reference wherein under *Biosynthesis of Thyroid Hormones* it is stated that: "The healthy thyroid gland takes up approximately 75 µg of iodine per day, provided enough dietary iodine is available (150-300 µg/d). Iodine is used to iodinate the tyrosine residues of a thyroid-specific protein thyroglobulin. The resulting 3,5-diiodotyrosine groups in the peptide chain of thyroglobulin react with each other or 3-monoiodotyrosine to form thyroxine (3,5,3',5'-tetraiodothyronine) or triiodothyronine, respectively. This thyroxine- and triiodothyroninecontaining thyroglobulin is stored in the colloid within the thyroid follicle. The normal human thyroid contains approximately 10 mg of iodine in this form. During secretion, thyroglobulin leaves the colloid and is hydrolyzed by the surrounding follicular cells. The liberated hormones, thyroxine ($T_4$) and triiodothyronine ($T_3$), are released into the blood at rates of ca. 100 and 8 µg/d, respectively."

The edible salt is chosen as a vehicle in the provision of iodine because of its uniform consumption and availability to all segments of the population independent of social or economic status. During the past twenty years, there has been a strong effort, lead by the United Nations, to iodize all salt for human consumption. Reference may be made to Ullmann's Encyclopedia above wherein it is stated that the iodine required by the body "is usually consumed as iodized salt that contains one part sodium or potassium iodide to 100,000 parts of sodium chloride." Reference may also be made to the book entitled "Endemic Goitre", by F. W. Clements et al., published by WHO in 1960 wherein it is stated that The Food and Nutrition Board of National Research Council of the USA placed the optimum requirement of iodine at 150-300 µg per day, and considering 10 gm of salt consumption per day, the iodisation level of salt could be around 15-30 mg per kg of salt.

Reference may be to the paper by R. Aquaron in Proceedings of $8^{th}$ World Salt Symposium, 2000, Vol. 2, pp 935-940 wherein the author has tabulated the information on the types of iodizing agent used in different countries. The table shows that either iodide or iodate is used singly for salt iodization. There is no mention of any other option of salt iodization.

Reference may be made to the article by J. T. Dunn in the book entitled "S.O.S for a billion" edited by B. S. Hetzel and C. S. Pandav, 1994, pp 108-109, wherein the use of iodized vegetable oils, and particularly a single injection of Lipiodol that contains 480 mg of iodine covalently bound to 1 ml of poppy seed oil, is reported to be useful for cure of severe iodine deficiency disorders. While this methodology is useful for correction of severe cases of iodine deficiency, it is not popular as a matter of routine.

Reference may be made to the same article (pp 113-114) above wherein it is stated that water could be used as a vehicle for introducing iodine. The water was iodinated using iodine crystals before supply to the community. It specifically states that: "Iodine at a level of 500 µg/l has been used in community water supplies to reduce bacterial pollution. This iodine is available to the thyroid, and will certainly correct any iodine deficiency present, without any apparent problems from excessive iodine intake." The authors further go on to state that: "There has been continued interest in the possibility of using iodine to correct iodine deficiency and purify water at the same time. Many rural communities in developing countries share both the problems; so a joint solution would be attractive, and further investigation is needed. Only iodine in chemical form is effective, potassium iodide and potassium iodate are not."

Reference may be made to httn://www.extention.umn.edu/, University of Minnesota Extension Service home page, on topic entitled "Iodine-rich Drinking Water (Tubig Talino)—A Boost to Iodine Deficiency Disorders Control Program", wherein it is reported that iodine rich water is prepared, named as "water+I2" which can be mixed with potable water in prescribed proportion to supply daily intake of iodine in form of elemental iodine. While delivery of elemental iodine via the vehicle of water is reported above there is no corresponding prior art for salt.

Reference may be made to a paper entitled "Investigation on the stability of iodide and iodate in table salts in Iran and the determination of its impurities" by F. Halek and S. Boghozian, published in Proceedings of $8^{th}$ World Salt Symposium, 2000, Vol. 2, pp 1251-1252, wherein they have reported that although iodide should be preferred over iodate for better bioavailability, the latter is used for salt iodization in view of its higher chemical stability, especially when climatic factors and salt purity are not conducive for use of iodide. No effort is made to stabilize iodide in such salt not to mention of any efforts towards use of both iodide and iodate together as a source of latent iodine.

Reference may be made to a book entitled "Pharmacology & Pharmaco-Therapeutic" by V. Iswariah and M. N. Guruswami, 1979, pp 548, wherein the following comment is made regarding iodine metabolism: "In addition to elemental iodine, iodides of potassium and sodium may be used to obtain systemic effects of iodine . . . Iodates are of no value."

Reference may be made to a paper entitled "The stability of potassium iodate in crude table salt", by Arroyave, G. et. al., in *Bull. World Health Organisation*, 1956, 14, pp 183-155, wherein potassium iodate was stabilized by calcium carbonate in crude sea salt stored in hemp fiber sacks for up to eight months at ambient temperatures and relative humidity between 70 and 84%. Only some 3.5% of added iodine was reported to be lost. The work only deals with stability of iodate in pure form.

Reference may be made to the Indian patent application No. 1219/DEL2004 dated 30 Jun. 2004 (also filed in U.S.A. and under PCT) by P. K. Ghosh et. al. wherein the authors have prepared a novel iodizing agent in which synthetic hydrotalcite type compound is used to intercalate iodate anion in the compound matrix. They have claimed to have completely suppressed the loss of iodine from iodised salt. The work deals with stability of iodate only in pure form.

Reference may be made to a paper entitled "Micro encapsulation for iodine stability in salt fortified with ferrous fumarate and potassium iodide" by Diosady L. L. et. al., in *Food Research International*, 2002, Volume 35, Issue 7, pp 635-642 wherein potassium iodide or potassium iodate was encapsulated in modified starches, gelatin, sodium hexametaphosphate and purified sodium chloride by spray drying and fluidized bed drying to produce microcapsules containing 0.3 to 2% iodine. The work is of relevance to preparation of double fortified salt but does not teach any improved method as such for iodine delivery or cost-effective iodization.

It will be evident from the prior art above that elemental iodine and iodide salts are preferred from the viewpoint of bioavailability but no attempt has been made so far in the literature to supply elemental iodine via the vehicle of salt. This would be a highly desirable objective especially if such elemental iodine can be delivered through salt in easy and cost-effective manner.

Reference may be made to Vogel's "Text Book of Quantitative Inorganic Analysis", 4$^{th}$ Edition, 1978, pp 371, wherein the following chemical equations are reported for the reaction of elemental iodine with alkali.

$$3I_2 + 6OH^- \rightarrow 3I^- + 3IO^- + 3H_2O \quad \text{(eq 1)}$$

$$3IO^- \rightarrow 2I^- + IO_3^- \quad \text{(eq 2)}$$

$$\text{Net: } 3I_2 + 6OH^- \rightarrow 5I^- + IO_3^- + 3H_2O \quad \text{(eq 3)}$$

Reference may be made to Encyclopedia of Chemical technology, 4$^{th}$ edition, Kirk & Othmer, 1992, Vol 19, pp 1084, wherein the iodizing agents normally used for salt iodization, namely KI and KIO$_3$, are prepared from the product mixture of eq 3 which entails additional cost. Indeed, it is reported that market price of USP sodium iodide is 1.8-2.0 times the I$_2$ price. Similar is the situation for potassium iodate.

Reference may once again be made to Vogel's "Text Book of Quantitative Inorganic Analysis", 4$^{th}$ Edition, 1978, wherein it reported on pp 386 that iodide and iodate can be made to react in presence of 0.1-2.0 M HCl medium as per the reaction of eq. 4.

$$IO_3^- + 5I^- + 6H^+ \rightarrow 3I_2 + 3H_2O \quad \text{(eq 4)}$$

Reference may be made to U.S. Pat. No. 6,740,253 dated 25 May, 2004 by G. Ramachandraiah, P. K. Ghosh et al. wherein the use of bromide-bromate couple, that follows similar chemistry to eqs 1-4, has been reported as a latent source of bromine for preparation of bromine addition compounds.

Reference may be made to "A Handbook for Quality Control Personnel in Production and Monitoring of Iodised Salt" issued by Salt Commissioner, Government of India, Ministry of Industries, Jaipur, February 1994 wherein the methodology of eq 4 is utilized for estimation of iodine contents of salts that are iodized with iodate. In the method adopted, the salt is dissolved in water and excess quantity of KI is added along with acid. The liberated iodine is titrated with sodium thiosulphate of known concentration. No one has however considered the use of a mixture of iodide and iodate as iodizing agent to carry out similar chemistry in the body to release elemental iodine.

Reference may be made to any book of medical science wherein it is stated that whereas the pH in the mouth is typically 7.0-7.5, gastric juice in the stomach contains significant concentration of HCl and, consequently, a pH<3.0 that would be suitable for converting the latent elemental iodine into active elemental iodine for absorption by the body.

OBJECTS OF THE INVENTION

The main object of the present invention is to produce an iodized salt that delivers iodine in the stomach in the form of elemental iodine for high bioavailability.

Another object is to provide an iodizing agent that can fulfill the above objective.

Another object is to utilize the iodide-iodate couple in 5:1 molar ratio as iodizing agent.

Another object is to prepare such iodizing agent from the reaction of elemental iodine with aqueous alkali.

Another object is to use NaOH or KOH or Ca(OH)$_2$ as alkali.

Another object is to reduce the cost of iodization by directly utilizing the aqueous alkaline iodine solution for such salt iodization.

Another object is to adjust the pH of common salt in the range of 7.5-8.0 to impart stability to the iodized salt.

Another object is to show that such iodized salt has adequate stability under accelerated storage condition.

Another object is to show that when such iodized salt is exposed to acidic conditions such as those encountered in the stomach, nearly quantitative amount of elemental iodine is liberated.

Accordingly the present invention provides a novel iodized salt comprising edible common salt in granular or powder form and iodizing agent as admixture of iodide and iodate salts and having neutral to alkaline pH wherein the said iodized salt is cost-effective to produce, stable on storage and liberates elemental iodine under acidic conditions as in the stomach.

In another embodiment of the present invention wherein the iodized salt having pH of 7.0-8.0; mesh size of −20 to −30 BSS mesh, and containing: 95.0-99.8% NaCl; 10-50 ppm total iodine in the form of alkali or alkaline earth metal salts of iodide and iodate in 5.2:1 to 5.0:1 molar ratio; moisture in the range of 0.5-5%; Mg$^{2+}$ in the range of 0.01-0.10%; Ca$^{2+}$ in the range of 0.02-0.40%; SO$_4^{2-}$ in the range of 0.05-0.80%.

SUMMARY OF THE INVENTION

The present invention is directed to provide a novel iodized salt wherein the iodizing agent is a mixture of iodide and iodate. The iodizing agent is obtained inexpensively in solution form and is stable at neutral to alkaline pH whereas it is unstable in acidic pH as in the stomach and liberates elemental iodine that is more readily absorbable by the body than either iodide or iodate used singly in the prior art of salt iodization. Accordingly the present invention outlines the process of preparation of such iodized salt comprising of the following steps: (i) adding iodine crystals' into aqueous alkali under ambient conditions to disproportionate the I$_2$ into iodide and iodate, (ii) ensuring that pH of the salt to be iodized is in the range of 7.5-8.0 through manipulation with alkali if required, (iii) spraying the iodizing agent on the salt to achieve desired level of iodization, (iv) mixing thoroughly the wet iodized salt, (v) drying the wet iodized salt with hot air, (vi) analyzing the salt for its iodine content releasable in the form of $I_2$ upon acidulation, and (vii) packing the salt as per the known prior art.

In an embodiment of the present invention the $I_2$ crystals used had 99.5% minimum assay.

In another embodiment of the present invention the alkali used was selected from KOH, NaOH and $Ca(OH)_2$.

In yet another embodiment of the present invention the molar ratio of $I_2$ to alkali was based on the stoichiometry of eq 3.

In yet another embodiment of the present invention the iodide to iodate molar ratio was in the range of 5.2:1 to 4.8:1.

In yet another embodiment of the present invention a slight excess of alkali was taken over the stoichiometry of eq 3 to stabilize the iodide-iodate mixture by maintaining a solution pH of 8.0-9.0.

In another embodiment of the present invention the iodine content of the alkaline iodine solution was in the range of 0.5-2.0% (w/v).

In yet another embodiment of the present invention pure iodide and iodate salts can be mixed in the desired molar ratio to serve as iodizing agent.

In yet another embodiment of the present invention the common salt used was refined solar salt with mesh size in the range of −20 to −30 and having the composition $Na^+$—37-39%; $Cl^-$—58-60%, $Mg^{2+}$—0.03-0.10%, $Ca^{2+}$—0.02-0.30%, $SO_4^{2-}$—0.05-0.50%, Moisture—0.3-3.0%.

In another embodiment of the present invention the releasable $I_2$ based on the stoichiometry of eq 3 was in the range of 10-50 ppm.

In another embodiment of the present invention the salt was air dried in an oven at 80-120° C. for 0.5-2.0 h.

In another embodiment of the present invention the $I_2$ that can be liberated from the iodized salt under acidic conditions was estimated following the reaction of eq 4 by dissolving the salt in an appropriate quantity of water, acidulating the solution with aqueous HCl and analyzing the liberated $I_2$ by titrating against $2.5 \times 10^{-3}$ N sodium thiosulphate with starch as indicator.

DESCRIPTION OF THE INVENTION

The present invention draws on the chemistry of eqs 3 and 4 to prepare a novel iodizing agent for salt iodization. The iodized salt contains elemental iodine in latent form which is released as per the stoichiometry of eq 4 when such salt reacts with gastric juices in the stomach. The iodide to iodate molar ratio is automatically adjusted by the stoichiometric constraints provided the required quantity of alkali is used. The reverse reaction also proceeds quantitatively as per this ratio provided there is no instability either of the iodide or the iodate in the iodized salt and required quantity of acid is available to complete the reaction of eq 4. The stability of the iodizing agent after preparation and after salt iodization is ensured by maintaining the required minimum alkalinity of the iodizing agent and of the resultant salt. It is particularly emphasized that magnesium impurities in salt can lower its pH because of eq 5 and alkali or a milder base is necessary to suppress eq 5 by tying up the $Mg^{2+}$ as per eq 6. Under optimum conditions the salt can be heated even up to 100° C. for 2-3 h as required for forced drying of salt in iodized salt manufacturing plants and in certain applications without incurring loss of iodine.

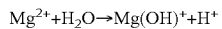

$$Mg^{2+} + H_2O \rightarrow Mg(OH)^+ + H^+ \quad (eq\ 5)$$

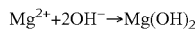

$$Mg^{2+} + 2OH^- \rightarrow Mg(OH)_2 \quad (eq\ 6)$$

Because there is no need of further processing of the alkaline iodine solution, this iodizing agent is the lowest cost option when compared with the conventional iodizing agents used hitherto for salt iodization. Moreover, because only one sixth of the total iodine in the iodizing agent is from the iodate part, it is possible to prepare a soluble 5:1 $CaI_2$ to $Ca(IO_3)_2$ molar composition with total iodine content of up to 2.0% (w/w) at room temperature without encountering any problem of solubility normally encountered while working with $Ca(IO_3)_2$ alone. This allows even the least expensive alkali, namely lime, to be used in the process of the invention. Because of the neutral to slight alkaline pH of the mouth, the iodized salt in solid or dissolved form will remain perfectly stable till such time as it reaches the stomach. The elemental iodine will be released at that point because of the high acidity in the stomach and the operation of eq. 4 and it can thereafter be absorbed in the gastro-intestinal system. Elemental iodine is supposedly the most bioavailable among all inorganic iodine delivery systems conventionally used and this should enable lower amounts of iodine to be used in iodized salt.

Resublimed elemental iodine having assay of 99.5% was used in the present invention. NaOH and KOH were of AR grade. $Ca(OH)_2$ was freshly prepared by slaking lime and the minimum assay was 92-94%. The Solar salt used was produced in the Institute's salt farm having minimum purity (on dry basis) of 98% and mesh size of −20 BSS mesh after refinement. Iodine estimation was carried out as per the well known prior art for iodate estimation in common salt using the reaction of eq 4 as the basis followed by titration with $Na_2S_2O_3$ and starch as indicator except that no external KI is added and the elemental iodine forming reaction occurs only between the iodide and iodate present together in the salt on addition of acid.

Inventive Steps

The main inventive step is the conception of the idea to supply elemental iodine to the body through an appropriately formulated iodized salt.

Another inventive step is the recognition that although $I_2$ cannot directly be incorporated into salt for this purpose due to several reasons such as volatility, color and odour, there may be a way of delivering such iodine through a latent source that obviates the above difficulties.

Another inventive step is the recognition that the iodide-iodate couple in 5:1 molar ratio can be used as a source of latent $I_2$.

Another inventive step is the recognition that such a system, with automatic adjustment of iodide-iodate molar ratio to the value of 5:1 can be prepared cost-effectively by reacting iodine crystals with alkali in appropriate ratio.

Another inventive step is the recognition that the alkaline iodine solution can be used directly as iodizing agent which makes it economically attractive.

Another inventive step is imparting required iodine stability in the salt through suitable adjustment of pH of the salt to be iodized.

Another inventive step is the recognition that gastric juices would provide the required acidic environment for converting the latent $I_2$ into active $I_2$ for more facile absorption by the body.

The following examples are given by way of illustration and should not therefore be construed to limit the scope of the present invention.

Example-1

3.7 ml of an aqueous solution containing 3.7 mg ($2 \times 10^{-5}$ moles) KI was mixed with 0.9 ml of a solution containing 0.925 mg (4×10⁻⁶ moles) of $KIO_3$ to give 4.6 ml of a solution containing 5:1 molar ratio of iodide to iodate with total iodine content of 3.38 mg. 100 ml distilled water was added next followed by addition of 1.7 ml of 6N HCl. The resultant iodine generated was titrated against $2.48×10^{-3}$ N $Na_2S_2O_3$. The iodine liberated was found to be 2.93 mg, i.e., 87% of the input iodine in the form of KI and $KIO_3$.

Example-2

100 gm of solar salt having composition $Cl^-$—60%, $Mg^{2+}$—0.06%, $Ca^{2+}$—0.02%, $SO_4^{2-}$—0.05%, Moisture—0.3% and pH of 6.0-6.5 was iodised by spraying 4.6 ml of the iodide-iodate (5:1 molar ratio) solution of Example 1 containing 3.38 mg ($2.40×10^{-5}$ moles) total iodine content and mixing the wet salt thoroughly. 100 ml water was added to the iodised salt so prepared and acidulated by addition of 1.7 ml (0.01 moles) 6N HCl. The iodine liberated on addition of acid was estimated by the method of Example 1 and found to be 3.30 mg or 97% of iodine input in the form of KI and $KIO_3$.

Example-3

The experiment of Example 2 was repeated except that the wet iodized salt was dried at 100° C. in an oven for 2 hrs following which the salt was dissolved in water, acidulated and analysed for $I_2$ as per the process of Example 2. The amount of liberated iodine was found to be 1.73 mg or 51% of iodine input in the form of KI and $KIO_3$.

Example-4

123 mg elemental Iodine was dissolved in 1.5 ml of 1.12N NaOH by stirring well for 5 minutes and the content was made up to 70 ml by addition of distilled water. 2 ml aliquot (containing 3.52 mg total iodine in the form of sodium iodide and sodium iodate in 5:1 ratio) was taken from this solution and diluted with 2.6 ml water. The resultant solution was sprayed onto 100 g of the salt of Example 2. 100 ml water was added into the salt followed by 1.8 ml 6N HCl. The quantity of iodine liberated was estimated to be 3.81 mg which is marginally higher than the value of input iodine, presumably because of measurement errors.

Example-5

The experiment of Example 4 was repeated except that the salt obtained after spray iodization was dried at 100° C. for two hrs before adding water and acid to liberate elemental iodine. The quantity of iodine liberated was found to be 1.76 mg which is only 50% of the input iodine value.

Example-6

The experiment of Example 5 was repeated except that the salt containing 0.06% $Mg^{2+}$ was first treated with 2.8 ml of 1.12N NaOH solution as a result of which the pH of the salt increased from 6.0-6.5 to ca. 7.5-8.0. The oven dried salt after iodization was once again treated with 100 ml water followed by 2.6 ml of 6N HCl and analysed for liberated $I_2$. The quantity of $I_2$ was found to be 3.78 mg which is close to the input iodine value of 3.52 mg.

Example-7

The experiment of Example 6 was repeated except that the alkali content of the iodizing solution was itself adjusted so as to both iodize the salt and simultaneously raise its pH to 7.5-8.0. The iodine liberation results were similar to that reported in Example 6.

Example-8

Iodizing agent as described Example 4 was prepared replacing NaOH with $Ca(OH)_2$. 132 mg elemental iodine was reacted, under stirring for 1 h, with 20 ml of LR grade $Ca(OH)_2$ slurry containing 96 mg of $Ca(OH)_2$ of 75% purity. The volume of the solution was then raised to 70 ml by addition of distilled water.

Example-9

The experiment of Example 5 was repeated except that $NaI/NaIO_3$ was replaced with $CaI/CaIO_3$ iodizing agent of Example 8. The input iodine content of the salt was 3.8 mg/100 g of salt whereas the liberated iodine from the dry iodized salt was 3.5 mg/100 g of salt.

The main advantages of the present invention are:
i. Iodine in the form of more potent elemental iodine can be delivered in the stomach through the vehicle of salt.
ii. The iodizing agent of the present invention would be both easier and cheaper to produce than either of the conventional iodizing agents used hitherto for salt iodization, namely pure iodide or iodate salts.
iii. Delivery of iodine in the form of elemental iodine via the iodide-iodate system may lead to greater efficacy of treatment of iodine deficiency disorders.
iv. The reduced cost of preparing the iodizing agent can simultaneously reduce the cost of salt iodization.

We claim:

1. A granular or powder edible iodized salt comprising:
   95.0% to 99.8% of NaCl
   0.01% to 0.10% of Mg2+;
   0.02% to 0.40% of Ca2+;
   0.05% to 0.80% of SO42;
   10-50 ppm total iodine in the form of alkali or alkaline earth metal salts of iodide and iodate in 5.2:1 to 5.0:1 molar ratio, effective to liberate elemental iodine under acidic conditions;
   a pH of 7.0-8.0;
   a mesh size of −20 to −30 BSS mesh; and
   a moisture content of 0.5% to 5%.

2. An edible iodized salt in granular or powder form comprising:
   95.0% to 99.8% of NaCl
   0.01% to 0.10% of Mg2+;
   0.02% to 0.40% of Ca2+;
   0.05% to 0.80% of SO42−;
   an admixture of iodide and iodate ions that provide the iodized salt with an input iodine value, comprising:
   10-50 ppm total iodine in the form of alkali or alkaline earth metal salts of iodide and iodate in a 5.2:1 to 4.8:1 molar ratio, an amount effective to liberate elemental iodine under acidic conditions, wherein acidulation of the salt can yield elemental iodine in an amount of at least 50% of the input iodine value in accordance with the following equation:

$$IO_3^- + 5I^- + 6H^+ \rightarrow 3I_2 + 3H_2O \quad \text{(eq 4)}$$

a pH of 7.5 to 8.0;
   a mesh size of −20 to −30 BSS mesh; and
   a moisture content of 0.5% to 5.0%.

3. The iodized salt according to claim 2, wherein the edible salt comprises:

37% to 39% Na+;
58% to 60% Cl−;
0.03% to 0.10% Mg2+;
0.02% to 0.30% Ca2+;
0.05% to 0.50% SO42−; and
0.3 to 3.0% moisture.

4. The iodized salt according to claim 2, wherein the iodide and iodate are present in a molar ratio of 5.2:1 to 5.0:1.

5. The iodized salt according to claim 2, wherein the iodide and iodate ions are present in the iodized salt in respective amounts such that, upon acidulation, the iodized salt releases elemental iodine in a range of 25-35 ppm.

6. An edible iodized refined solar salt formed by:
(i) applying an iodizing agent to an edible salt having a pH in a range of 7.5 to 8.0 to form an admixture of the iodizing agent and the edible salt, wherein the iodizing agent is an aqueous solution comprising iodide and iodate ions, wherein the iodide ions and iodate ions are present in the solution in a molar ratio of iodide to iodate ions of 5.2:1 to 4.8:1 and wherein the aqueous solution has a neutral to alkaline pH; and
(ii) drying the admixture to form an iodized salt in granular or powder form that, in acidic conditions that are present in the stomach of a user, liberates elemental iodine according to the following equation:

IO3−+5I−+6H+*3I2+3H2O  (eq 4);

wherein the edible iodized refined solar salt comprises:
95.0% to 99.8% of NaCl
0.01% to 0.10% of Mg2+;
0.02% to 0.40% of Ca2+;
0.05% to 0.80% of SO42;
10-50 ppm total iodine in the form of alkali or alkaline earth metal salts of iodide and iodate in 5.2:1 to 4.8:1 molar ratio, effective to liberate elemental iodine under acidic conditions;
a pH of 7.0-8.0;
a mesh size of −20 to −30 BSS mesh; and
a moisture content of 0.5% to 5%.

7. The edible iodized refined solar salt according to claim 6, comprising:
37-39% Na+; and
58-60% Cl−.

8. The edible iodized refined solar salt according to claim 6, wherein the molar ratio of iodide and iodate is 5.2:1 to 5.0:1.

9. The iodized salt according to claim 8, wherein the iodized salt has a pH of 7.0-8.0, and a mesh size of −20 to −30 BSS mesh.

10. A process for the preparation of edible iodized salt comprising the steps of:
(i) applying an iodizing agent to an edible salt having a pH in a range of 7.5 to 8.0 to form an admixture of the iodizing agent and the edible salt, wherein the iodizing agent is an aqueous solution comprising iodide and iodate ions, wherein the iodide ions and iodate ions are present in the solution in a molar ratio of iodide to iodate ions of 5.2:1 to 4.8:1 and wherein the aqueous solution has a neutral to alkaline pH; and
(ii) drying the admixture to form an iodized salt in granular or powder form that, in acidic conditions that are present in the stomach of a user, liberates elemental iodine according to the following equation:

IO[+5I+6H+−'*3I2+3H2O  (eq 4);

wherein the iodized salt comprises:
95.0% to 99.8% of NaCl
0.01% to 0.10% of Mg2+;
0.02% to 0.40% of Ca2+;
0.05% to 0.80% of SO42;
an admixture of iodide and iodate ions that provide the iodized salt with an input iodine value, comprising:
10-50 ppm total iodine in the form of alkali or alkaline earth metal salts of iodide and iodate in 5.2:1 to 4.8:1 molar ratio, an amount effective to liberate elemental iodine under acidic conditions, wherein acidulation of the salt can yield elemental iodine in an amount of at least 50% of the input iodine value in accordance with the following equation:

IO3−+5I−+6H+−3I2+3H2O  (eq 4);

a pH of 7.0 to 8.0;
a mesh size of −20 to −30 BSS mesh; and
a moisture content of 0.5% to 5%.

11. A process for preparation of a granular iodized edible salt comprising the steps of:
(i) mixing iodine crystals with an aqueous alkali solution to form a latent iodine solution comprising iodide and iodate ions;
(ii) applying the latent iodine solution to a refined granular salt having a pH in a neutral to alkaline range to form a wet iodized salt;
(iii) mixing the wet iodized salt; and
(iv) drying the mixed iodized salt to form a dry iodized salt in granular or powder form that, upon acidulation, will release elemental iodine according to the following equation:

IO3+5I−+6H+−43I2+3H2O  (eq 4);

wherein the iodized salt comprises:
95.0% to 99.8% of an alkali selected from the group consisting of KOH, NaOH and Ca(OH)2;
0.01% to 0.10% of Mg2+;
0.02% to 0.40% of Ca2+;
0.05% to 0.80% of SO42;
10-50 ppm total iodine in the form of alkali or alkaline earth metal salts of iodide and iodate in 5.2:1 to 4.8:1 molar ratio, effective to liberate elemental iodine under acidic conditions;
a pH of 7.0-8.0;
a mesh size of −20 to −30 BSS mesh; and
a moisture content of 0.5% to 5%.

12. The process according to claim 11, wherein in step (i), the iodine crystals are mixed in the alkali solution in a molar ratio of I2 to OH— in a range of 1:2.01 to 1:2.1.

13. The process according to claim 11, wherein, upon acidulation, the dry iodized salt releases elemental iodine in a range of 25-35 ppm.

14. The granular iodized edible salt prepared by the process of claim 11.

* * * * *